Feb. 16, 1932.  J. BROCK  1,845,957
CULTIVATOR ATTACHMENT
Filed April 7, 1930   2 Sheets-Sheet 1

Inventor
Joseph Brock

By Shreve, Crow & Gordon
Attorneys.

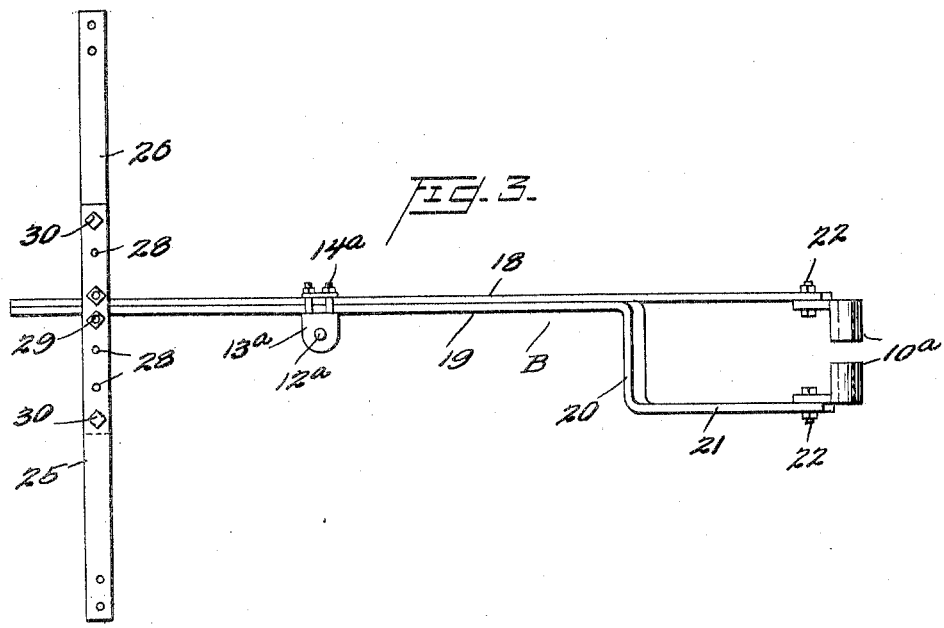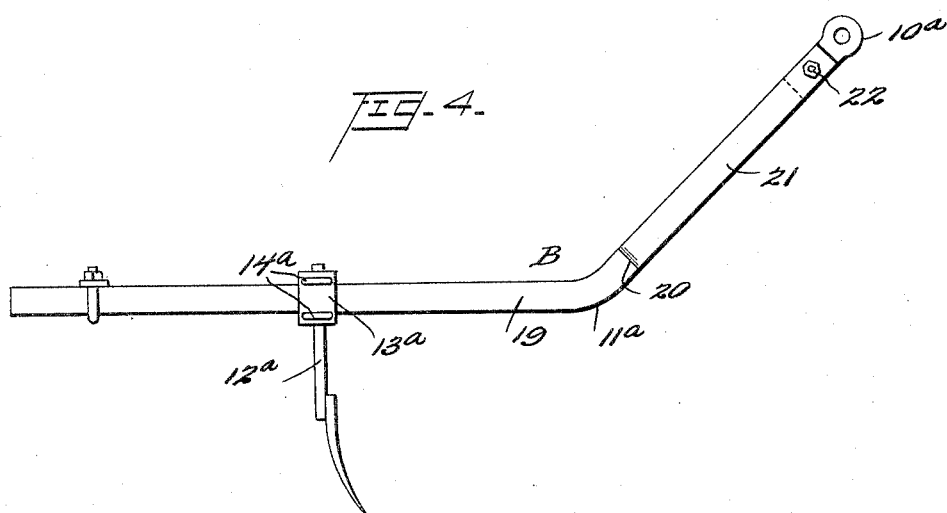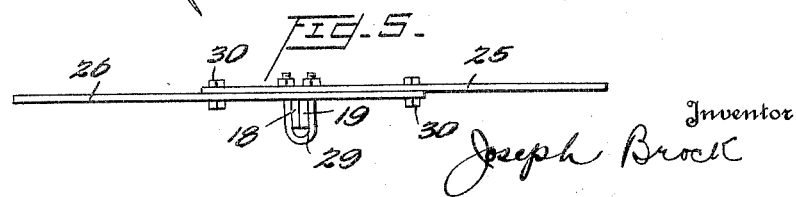

Patented Feb. 16, 1932

1,845,957

UNITED STATES PATENT OFFICE

JOSEPH BROCK, OF BAINBRIDGE, GEORGIA

CULTIVATOR ATTACHMENT

Application filed April 7, 1930. Serial No. 442,257.

Generically this invention relates to agricultural implements, but it is more especially directed to an attachment for a particular type known as cultivator.

One of the principal objects of this invention is the provision of an attachment for a cultivator representing an individual unit adapted to support a plow, disc, tooth or other form of ground working element, especially adapted for heavy duty service.

Another object of this invention is the provision of a plow supporting attachment constituting an individual unit adapted to be mounted intermediate the two ground working units normally carried by the cultivator and having novel means for securing said attachment to the said elements to provide a unitary structure and to prevent lateral movement of the plow or shovel element carried by the attachment with respect to the similar elements carried by the said units, said attaching means being adjustable with respect to said units.

A further important object of this invention is the provision of a novel supporting means for the plow carrying stock, said stock being longitudinally adjustable with respect to said supporting means, and adjustable brace means for centering said supporting means carrying the center plow with respect to the plow units and means for expeditiously connecting said brace to the units to provide a unitary structure especially adapted for heavy duty work.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

Fig. 3 is a plan view of my improved device disconnected from the cultivator.

Fig. 4 is a side elevation of Fig. 3, and

Fig. 5 is a fragmentary detailed rear view of Fig. 3.

Figure 1:
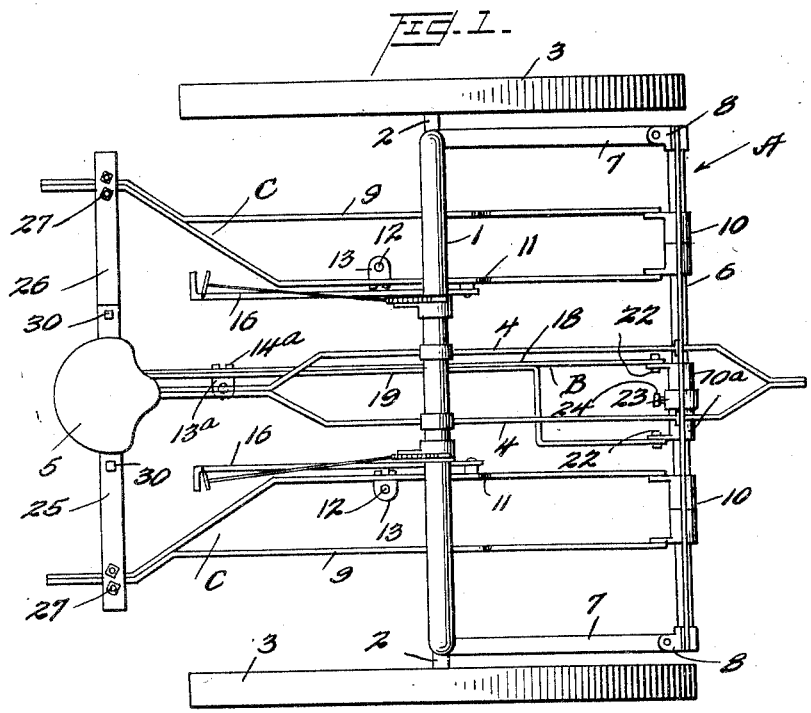
Fig. 1 is a top plan view of a cultivator showing my improved attachment operatively positioned.

In cultivators of this type, adapted as they are to a variety of uses, in one instance being employed for cultivating rows of growing crops, in others, as a weeder, harrow, etc., and for the respective uses, carrying different types of plows or shovels, and in connection with certain uses of this machine, a middle or center plow being necessary, for instance, in bedding up ground or in plowing out middle rows, such devices heretofore in use have proven deficient, being incapable of properly turning over or cultivating the center strip of ground between the respective units. It was to overcome the deficiencies of such devices and to provide a center plow attachment for cultivators, admitting of easy installation and removal, and adjustable means for mounting the same intermediate the units normally carried by the cultivator and of uniting the same into a unitary structure so as to prevent any lateral movement of the attachment with respect to the units, whereby any desired type of shovel may be employed and especially adapted to turn over or cultivate the strip of ground intermediate the units irrespective of the type of soil being cultivated, that I designed the device forming the subject matter of this invention.

In the illustrated embodiment characterizing this invention there is shown a cultivator A and center plow attachment B.

The cultivator A comprises an inverted substantially U-shaped support 1 terminating at its opposite ends in axle members 2 on which are mounted wheels 3. Suitably mounted on support 1 substantially central of its length are a pair of spaced bars 4 bent inwardly at points spaced rearwardly from support 1 with their ends in parallel contact to provide a support for seat 5, and similarly adjacent their forward ends, and to which is attached a draft equalizer as is well understood in the art. Suitably supported beneath bars 4 spaced forward of axle support 1 is a shaft 6 having its ends loosely connected to brace members 7 by anchor members 8, the lower end of said braces 7 being suitably connected to support 1.

Figure 2:
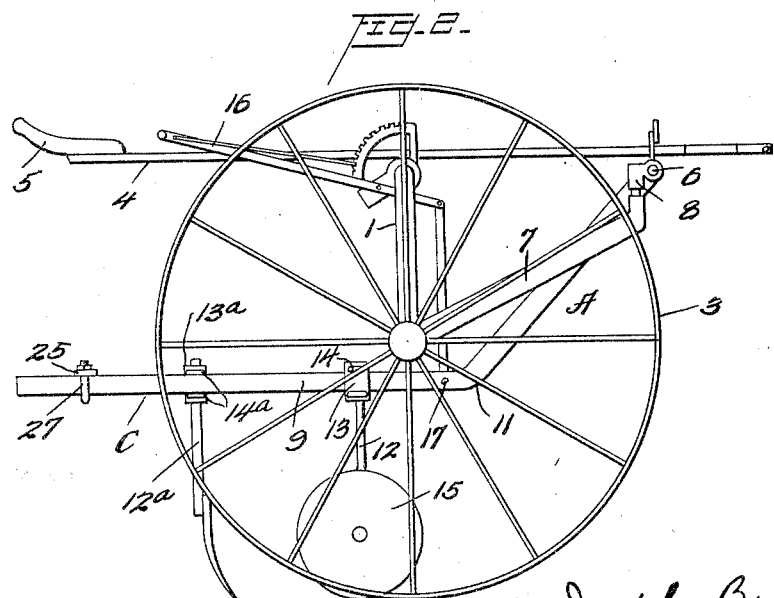
Fig. 2 is a side elevation of Fig. 1.

A drag bar unit C comprising supporting frame members 9 is mounted adjacent each of the wheels 3 and with its forward end mounted on shaft 5 by bearing members 10, said frame extending upwardly from a point as at 11 just slightly forward of the axles 2 to the shaft 6, as clearly shown in Fig. 2. Each of these units C carry a plurality of stocks 12 mounted in anchor members 13 secured to the members 9 by U-bolts or other suitable fastening elements 14. Said units C are raised and lowered by suitably operating mechanisms 16 mounted on supporting shaft 1 and connected to each of said units as at 17. The above structure is of conventional design and is shown principally for descriptive purposes.

The center plow attachment B includes a longitudinal bar 18 and complemental bar 19 constituting a supporting frame for stock 12a carried by anchor 13a secured thereto by bolts 14a. Intermediate anchor 13a and the supports 10a, the bar 19 is offset as at 20 to provide a spaced section 21. The forward ends of bars 18 and 19 are apertured to receive bolts 22 connecting bearing arms 10a thereto which are rotatably mounted on shaft 6, and in order to prevent any lateral movement of bars 18 and 19 with respect to shaft 6, a collar 23 is mounted on shaft 6 intermediate said bearing members being suitably secured thereto by set screw 24 or other suitable means. The bars 18 and 19 are bent upwardly at 11a to conform to the configuration of members 9 of the units C, heretofore described. The rear ends of bars 18 and 19 are supported by cross-bars 25 and 26. The outer end of each of these bars is supported on members 9 of units C and are secured thereto by U-bolts or other fastening elements 27, and the inner bar 25 is adapted to overlie the contacting end of bar 26. Each of these bars are formed with a plurality of apertures 28 adapted to be brought into selective registration to effect longitudinal adjustment thereof, and to properly center bars 18 and 19 connected thereto by U-bolt 29, said bars 25 and 26 are additionally secured in adjusted position by bolts 30 or other suitable fastening elements. It will thus be seen that attachment B may be easily detached by loosening anchor 8 and collar 23 and partially withdrawing shaft 6 so as to remove bearing arms 10a and collar 23, and loosening U-bolts 27 carried by bars 25 and 26, and by replacing shaft 6 the cultivator is ready for operation minus the attachment. It is obvious that to install the device, the reversal of the above operation is all that is necessary.

From the above description it is clear that the units C may be laterally adjusted and secured at any desired position with respect to center unit B by means of the adjustable supporting members 25 and 26, and that the central plow structure B may be likewise adjusted with respect to the space between units C. Also that when properly adjusted by the members 25 and 26 secured by U-bolts 27, the units B and C will constitute a unitary structure. By reason of bars 18 and 19 presenting a braced connection with shaft 6, and with units C at points spaced from opposite sides of said bars, said attachment B will be so braced that any type of shovel or plow 15 desired may be carried by stock 12a, and lateral movement of the same irrespective of working conditions, thereby prevented. In this connection it will be noted that anchor 13a carrying stock 12a may be longitudinally adjusted on bars 18 and 19 as desired.

Amplifying the above description with respect to attachment and removability of the device where it is frequently employed, it is not necessary to remove the shaft 6, the device being completely detachable by simply removing bolts 22 and 27.

From the above description it is apparent that I have designed a center plow unit or individual plow carrying attachment for cultivators capable of being easily installed as desired and as easily removable when not in use, comprising novel brace construction, means for adjustably connecting such attachment to the units normally carried by the cultivator to effect a unitary structure, and presenting such a rigid construction as to cooperate with said units to present an unbroken cultivating area co-extensive with that of said units, irrespective of the nature of the soil being worked, yet versatile in application, manufacturable at a reasonable cost and efficient for the purposes intended.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without department from or sacrificing any of the principles of this invention.

Having thus described my invention, what I desire protected by Letters Patent is as set forth in the following claims:

The combination with a cultivator having drag units, of a detachable ground working unit disposed centrally of said drag bar units adapted to be connected at its forward end to the cultivator at points spaced from each other, said detachable unit comprising a pair of bars, anchor means carried by the bars and longitudinally adjustable with respect thereto, earth working means carried by said anchor means, a brace connected to one end of the bars comprising a pair of cross bars, the outer end of each bar connected to the respective drag bar units, the inner ends of said bars adapted for overlapping engagement, a plurality of perforations in the respective bars adapted for selective registration, fastening elements extending through such registered apertures, whereby a positive connection between said bars in adjusted position is effected and relative movement of said ground working tool carried by said supporting bars with respect to said drag bar units is prevented.

This specification signed this 1st day of February, A. D. 1930.

JOSEPH BROCK.